United States Patent [19]

Fripiat

[11] 3,909,285
[45] Sept. 30, 1975

[54] METHOD OF GRAFTING ORGANIC GROUPS ON CALCIUM SILICATES

[75] Inventor: Jose, Marie, Maurice, Julien Fripiat, Wezembeek-Oppem, Belgium

[73] Assignee: Lafarge (Societe Anonyme), Paris, France

[22] Filed: Mar. 4, 1974

[21] Appl. No.: 447,881

Related U.S. Application Data

[63] Continuation-in-part of Ser. No. 306,735, Nov. 15, 1972, abandoned, which is a continuation-in-part of Ser. No. 80,777, Oct. 14, 1970, abandoned.

[52] U.S. Cl. .............................. 106/306; 106/308 Q
[51] Int. Cl.$^2$ ........................................... C09C 1/28
[58] Field of Search ..................... 106/306, 308 Q

[56] References Cited
UNITED STATES PATENTS
2,886,460  5/1959  Alexander et al. ............. 106/308 Q

*Primary Examiner*—Patrick P. Garvin
*Assistant Examiner*—J. V. Howard
*Attorney, Agent, or Firm*—Brumbaugh, Graves, Donohue & Raymond

[57] ABSTRACT

Organosilicon groups are grafted onto calcium silicates by treating the calcium silicates with an organosilane or hydrolyzable organosiloxane in an acidified alkanol containing a water-soluble calcium salt. The treated calcium silicates are useful in the production of cement-based products having improved resistance to weather and corrosive agents.

24 Claims, No Drawings

METHOD OF GRAFTING ORGANIC GROUPS ON CALCIUM SILICATES

The present application is a continuation-in-part of the predecessor application Ser. No. 306,735, filed Nov. 15, 1972, which in turn was a continuation-in-part application of the parent application Ser. No. 80,777 filed Oct. 14, 1970, both now abandoned.

The invention relates generally to the production of organic derivatives of mineral substances. It also has as its object a method of grafting organic groups on anhydrous or hydrated calcium silicates. The process of the invention makes it possible to graft organosilicon groups onto calcium silicates.

The terms defined below will be used throughout this application.
1. organosilicon groups: Groups which contain one or more than one silicon-carbon linkage.
2. organosilane: A compound of the type

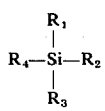

wherein $R_1$ is a hydrocarbon radical, $R_2$ is a halogen atom or a hydroxyl group and $R_3$ and $R_4$ are selected from the group consisting of halogen atoms, hydroxyl groups or hydrocarbon radicals.
3. organosiloxane: A compound of the type

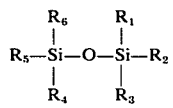

wherein $R_1$-$R_6$ are hydrocarbon radicals.

It is known that calcium silicates represent an important mineral constituent of numerous substances, particularly cement. Thus, tricalcium silicate $3CaO \cdot SiO_2$, frequently abbreviated as $C_3S$, is the main constituent of Portland cement. Modern cements contain from 40 to 75% of $C_3S$ which is the predominantly active ingredient in artificial cements. Hydrated calcium silicate is produced from the hydration of the two main constituents of anhydrous cement $3CaO \cdot SiO_2$ or $C_3S$ and dicalcium silicate, $2CaO \cdot SiO_2$ or $C_2S$. During this hydration, hydrated lime and different crystalline varieties of hydrated calcium silicate, designated under the generic name of CSH, are formed. The composition of hydrated calcium silicate is as follows:

$0.8 - 1.5\ CaO \cdot SiO_2, 1.0 - 2.5\ H_2O.$

Typically the hydrated cement contains about 50% of CSH, 25% of hydrated lime, and various other compounds. The crystalline structure of CSH is very close to the structure of a mineral compound of natural origin known under the name of tobermorite. Hydrated products originating from the hydration of cement show a large number of crystalline structures which are still inadequately defined at the present time. From the morphological point of view the different crystalline varieties of CSH are found in the form of platelets and/or fibres or fine needles.

The binding properties or adhesivety of Portland cement paste are due principally to the formation of CSH and lime, which results in the creation of a high specific surface and internal cohesive forces.

The Portland cement hydrate formed in this manner, which is the main constituent of concretes, has various wellknown shortcomings, for example, lack of tensile strength, shrinkage (slight contraction observed under the influence of low hygrometry), and creep (irreversible deformation under the action of a load, due to movements of internal water).

The principal object of the present invention is the reduction of the known disadvantages of the prior art calcium silicate based products, specifically cements, by the creation of chemical bonds between calcium silicates and organic groups.

The invention also has as an object the provision of cement based materials wherein hydrophobic organic compounds are present in order that materials will exhibit an improved resistance to corrosive agents and weather.

More specifically the invention relates to anhydrous or hydrated calcium silicates onto which organosilicon groups have been grafted to replace a portion of the calcium atoms and a method for producing said grafted compounds.

To accomplish the above objects, calcium silicate is brought into intimate contact with a liquid reaction medium comprising at least one organosilane or hydrolyzable organosiloxane, said siloxane or silane being dissolved in a solvent consisting essentially of an alkanol containing a water soluble calcium salt, and which is acidified so as to provide an $H^+$ ion concentration permitting both the hydrolysis of the siloxane or silane and the dissolution of a portion of the calcium ions available in the silicate which is utilized. The reaction is effected at a temperature between ambient temperature and the reflux temperature of the medium and for a reaction time sufficient to permit replacement of a portion of the calcium atoms in the calcium silicate.

In a preferred embodiment of the invention the organosilicon group may be an alkyl silyl group, for example trimethyl silyl in which case the siloxane used in the reaction is an alkylated siloxane, for example hexamethyldisiloxane (abbreviated as HMD). The reaction can be illustrated by the following reaction diagram:

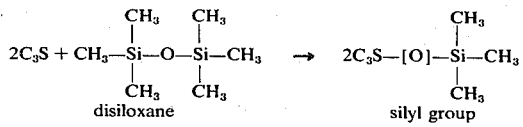

In this diagram, the abbreviation $C_3S$ denotes a tricalcium silicate. The substituent group of the silyl group may also be unsaturated, particularly ethylenically unsaturated. Generally, the organic substituents of the organosilicon groups and the silanes or siloxanes utilized in the method of the invention should be hydrocarbon groups which may be unsaturated and may contain non-hydrocarbon substituents, for example halogen atoms. An example of such a halogen substituted silane is methyl vinyl dichlorosilane, in which case the grafted group is a polysiloxanyl group.

It is advantageous for a mineral acid which produces soluble calcium salts, preferably hydrochloric acid, to be used as the source of $H^+$ ions. In the case of the treatment of anhydrous $C_3S$, the concentration of HCl in the medium should be in the range of about 0.05 to 1 N, for example about 0.12 N. In practice it is preferable to increase the concentration of HCl in order to obtain a suitable degree of grafting. Nevertheless, it is not possible to work with excessively high concentrations of HCl, because the available calcium ions would be extracted too rapidly from the reaction medium to enable the organic reagents to reach the grafting sites.

In practice, satisfactory results have been obtained with hydrochloric acid, but it would also be possible to use other, weaker acids. Tests carried out with acetic acid mixed with an alkanol, such as isopropanol, yielded more uncertain results in respect of grafting, no doubt because calcium acetate is only slightly soluble in alcohol.

As has previously been mentioned, the reaction medium contains an alkanol. The alkanol may be previously saturated or less than saturated with a water soluble calcium salt, preferably $CaCl_2$. The presence in solution of calcium salt, $CaCl_2$, makes it possible in fact to slow down the extraction of the calcium ions with the object of effecting suitable grafting by the fixing of organic radicals on the silanol sites formed.

Methanol, ethanol, or isopropanol may be used as the alkanol. For practical reasons preference is given to methanol. In view of the fact that the operation is carried out in the presence of a considerable amount of calcium chloride, it is in fact preferable to use an alkanol in which $CaCl_2$ is readily soluble. On the other hand, the relatively poor solubility of $CaCl_2$ is isopropanol (25 g/100 ml) is well known.

The grafting reaction is preceded by an attack on the $C_3S$, which frees an additional amount of $CaCl_2$. The reaction medium consisting of isopropanol + $CaCl_2$ very quickly becomes supersaturated and, in certain cases, difficult to agitate.

On the other hand methanol can dissolve up to 80 g $CaCl_2$/100ml. The practical advantage of methanol is therefore twofold, since it permits good homogenization of the reaction medium and because its price is lower.

The principal factors which influence the grafting of a particular organosilicon group are the nature of the solvent, the reaction temperature, the reaction time, and also the $H^+$ ion concentration of the reaction medium. When operating in an alcoholic medium saturated with $CaCl_2$ and when anhydrous $C_3S$ is treated, it has been found that $C_3S$ disappears progressively as the reaction proceeds and that the fixing of the substituted organosilicon groups becomes evident after a minimum treatment time, all other factors being equal. When only the proton concentration of the reaction medium was varied, grafting began after a certain minimum amount of $H^+$ ions were introduced into the reaction medium, and significant effects were produced by a slight variation of the concentration of protons. An increase in temperature is on the whole favorable to grafting and makes it possible to obtain a product having a higher organic content with reduced destruction of the silicate support.

By varying the reaction time, the proton concentration, and the temperature, the progress of the grafting reaction may be controlled with a view to grafting the maximum number of organic groups, with minimum destruction of the silicate support and without the content of organic radicals inhibiting the hydraulic properties of the $C_3S$.

It has also been found that the organosilicon groups, particularly alkyl silyl groups, can be securely grafted in the same manner on the surface of hydrated calcium silicates. Chemical analyses relating to the carbon content of the calcium silicate before and after grafting, as well as infrared spectrography, reveal the existence of new organic derivatives of calcium silicate after grafting. Thus, the grafting of trimethylsilyl groups on a hydrated calcium silicate requires previous acid hydrolysis of the HMD reagent and the creation of active SiOH sites on the mineral by acid attack.

When the reaction medium is less than saturated by a water soluble calcium salt, an organosilicon group, such as a silane, having more than one hydrolyzable substituent, and which may have saturated or unsaturated hydrocarbon substituents can be used in the grafting reaction. In this case the grafted group is a polysiloxanyl group having saturated or unsaturated substituents corresponding to those of the starting silane.

One embodiment in a reaction medium which is less than saturated with a calcium salt utilizes methylvinyldichlorosilane. This results in the grafting of a methylvinylpolysiloxanyl group. The reaction may be illustrated as follows:

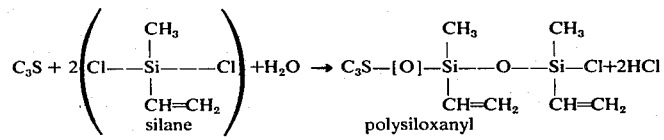

Also, in the "unsaturated case" it is possible to use in the grafting reaction a silane having a single hydrolyzable substituent and which may have saturated or unsaturated hydrocarbon substituents corresponding to those of the starting silane. One such embodiment utilizes allyldimethylchlorosilane, in which case the grafted group is allyldimethylsilane. In this case the reaction can be illustrated by the following reaction diagram:

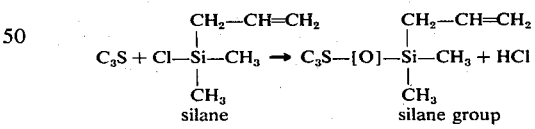

When the starting silane contains two or more than two hydrolyzable substituents, polysiloxanyl grafted groups are obtained by the condensation of silane onto itself. It is most advantageous to use one or more chloro groups as hydrolyzable substituents.

The grafting treatment involves solubilizing calcium by acid attack in order to create the silanol groups which are the active sites for attaching the organic groups. Nevertheless, because the silanol groups tend to polymerize with one another and thus to inhibit grafting, it is advisable not to extract the calcium more quickly than the organosilicon groups can be fixed in their place. Without limiting the invention by a theoretical interpretation, it is thought that various processes are involved in the course of the grafting, one of which gives rise to irreversible grafting on silicic layers containing SiOH sites.

In this respect it is probable that two different grafting processes are involved, one consisting of unstable fixation on calcium residues dissolving in the course of the subsequent progress of the reaction, and the other consisting of an irreversible fixation on the SiOH sites freed by the acid attack.

In the case of the grafting of CSH, the organic products obtained have a generally fibrous morphology, as revealed by examination with the electronic microscope. Attempts at extraction with boiling benzene have shown the strength of the bond of the silicon atoms of the organosilicon groups to the mineral surface. Grafting imparts to the product a hydrophobic character which is revealed by the fact that it is not attacked by concentrated HCl. Water absorption tests show that the hydrophobic character is accentuated with increased treatment time and increased C content.

The new organic derivatives of calcium silicate therefore resist corrosive agents better than calcium silicate. This property is utilized in order to impart to cement based materials increased resistance to corrosive agents and to weather.

The invention is further illustrated though not limited by the following Examples.

EXAMPLE 1

In this example, various grafting tests were carried out by treating calcium silicate in an isopropyl alcohol medium previously saturated with $CaCl_2$ in the presence of hexamethyldisiloxane (HMD) and HCl.

A sufficient amount of HCl was used to hydrolyze the HMD and extract the calcium from the silicate, while keeping the rate of extraction of the calcium as low as possible. This amount of HCl was determined with a view to grafting about one trimethylsilyl group per atom of silicon in the lattice of the calcium silicate used.

As a result of these controlled reaction conditions, mixed compounds were obtained in which the $C_3S$ was not completely destroyed and was combined with a new grafted silicic structure.

a. In the first series of tests the reaction time was varied.

The reactions were carried out in a 500 ml balloon flask having a ground neck and surmounted by a reflux condenser. The flask itself was immersed in a bath in which water at about 15°C. circulated.

187 ml of isopropanol saturated with $CaCl_2$, 8 ml of 12N HCl, and 5 ml of HMD were introduced in succession. The mixture was allowed to react for 15 minutes to ensure that the hydrolysis of HMD was completed, and then 4g of $C_3S$ were added.

The reaction was allowed to proceed for times ranging from 4 minutes to 3 hours.

The modification of the $C_3S$ in the course of the reaction was followed by infrared spectroscopy. The bands at 10.7, 11.4, and 19.5$\mu$ characteristic of $C_3S$ became progressively weakened in the course of the reaction, while bands at 8.4 and 9.3$\mu$ characteristic of new, more condensed silicic structure were simultaneously developed. The fixing of the organic groups, revealed by the band at 7.95$\mu$ characteristic of the radical $CH_3$, was observed after a treatment time of 22 minutes, but the $C_3S$ structure is far from being completely destroyed at this stage, which shows the presence of mixed compounds of $C_3S$ and of the grafted silicic structure.

b. In this series of tests the $H^+$ ion concentration of the medium was varied.

The mode of operation was similar to that of example 1a, but in this case, with a constant reaction time of 30 minutes, the total volume of solvent and consequently the proton concentration were varied.

The reaction was conducted on 8 g of $C_3S$ in total volumes of 150, 180, 190 and 200 ml respectively, the amounts of HCl and HMD being kept constant (15 ml of HCl and 10 ml of HMD).

The infrared spectra obtained show an evolution similar to that observed in example 1a, that is to say a weakening of the 10.7 and 11.4$\mu$ bands of the $C_3S$ and a strengthening of the 8.4 and 9.3$\mu$ bands characteristic of the new arrangement of the silica tetrahedra.

With a total volume of 180 ml the bands attributed to the trimethyl silyl group were seen to appear, that is to say $CH_3$ at 7.95, 11.8, and 13.15$\mu$ and CH at 3.35$\mu$.

These bands were already defined when the experiment was conducted with a total volume of 190 ml.

EXAMPLE 2

The tests reported below had the object of showing the capacity of compounds based on grafted $C_3S$, as obtained in example 1, for hydration into CSH.

The samples subjected to this treatment were prepared under the following conditions:

a. 160 ml isopropanol saturated with $CaCl_2$
   20 ml HCl 12N
   20 ml HMD
   20 g $C_3S$
   50°C. for 10 minutes.

In order to obtain a lower degree of destruction of the $C_3S$ the conditions were then changed as follows:

b. Identical to a but at 35° for 5 minutes.

c. Identical to a with the following exceptions:
   260 ml of isopropanol saturated with $CaCl_2$ 35°C. for 5 minutes.

The results of these tests are shown in table I, which gives an analysis of the various samples after the hydration treatment.

For the purpose of hydration the various above-mentioned samples of $C_3S$ were subjected to hydrothermal conditions in an autoclave at 180°C. and 10 atmospheres for 2 days. This mode of operation makes it possible to simulate approximately normal hydration of $C_3S$, the complete hydration of which at ambient temperature is known to take times of the order of several months.

TABLE I

| Sample | Non-hydrated | | | Hydrated | | |
|---|---|---|---|---|---|---|
| | A | B | C | A | B | C |
| Calcium (expressed as CaO) | 28.54 | 29.02 | 38.89 | 24.5 | 27.02 | 27.8 |
| $SiO_2$ | 58.94 | 63.12 | 44.73 | 67.72 | 64.42 | 60.29 |
| $Si(CH_3)_3$ | 6.22 | 3.63 | 3.12 | 1.23 | 1.52 | 2.58 |
| $H_2O$ | 3.58 | 2.58 | 0.90 | 6.01 | 6.47 | 8.20 |

X-ray diffraction measurements make it possible to reveal the hydration of tricalcium silicate by:

1. the appearance in the spectrum of lines characteristic of $Ca(OH)_2$, because of the excess of CaO liberated;
2. the appearance of less well defined lines due to CSH and finally
3. the attenuation of the $C_3S$ lines.

Only characteristics (2) and (3) were revealed by X-rays, the majority of the excess CaO having already been extracted when the grafting took place, as can be seen from table I.

The evolution of the product during hydration appeared more clearly in the infrared spectra. The $C_3S$ bands at 10.7 and 11.4$\mu$ were weakened and a new band at 10.4$\mu$ appeared.

The above results show that the organic derivatives of $C_3S$ are still hydrated despite the grafting treatment described in example 2. The CaO has in fact been extracted to a large extent (table I) and hydrophobic groups have been grafted. These results are proved in practice by the fact that, for example, the grafted cement A mixed with a water/cement ratio of 0.4 sets and hardens at the end of about 24 hours, which confirms its hydraulic character.

The examination of table I shows that the organic content varies in quantity in accordance with the mode of preparation of the samples and that it also varies in persistence, as can be seen by referring to the percentages of carbon after hydration.

EXAMPLE 3 a. A grafting operation was carried out under conditions identical to those described in example 1, but replacing hexamethyldisiloxane by methylvinyldichlorosilane (MVDCS). The grafting of

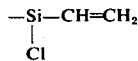

groups on the calcium silicate was thus effected, as revealed by infrared spectroscopy. It was thus possible to show that the grafted group corresponded to the following structural formula:

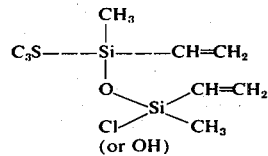

in which the abbreviation $C_3S$ has the meaning already assigned.

b. The derived grafted mixture of methylvinyldichlorosilane and polymer resulting from the hydrolysis of the unconsumed part of this product was also subjected to extraction with benzene.

For this purpose, 200 ml of methanol are taken and 50 g of $CaCl_2.2H_2O$ with 10 ml of methylvinyldichlorosilane (MVDCS) were added, and the mixture treated at 30°C. for 24 hrs. The grafted solid was collected. 5g of grafted solid was extracted with 200 ml benzene at 60°C. The infrared spectrum possessed no band attributable to the organic groups.

If on the other hand 200 ml of methanol, to which 3 g of $Ca(OH)_2$ with 10 ml of methylvinyldichlorosilane were added, was taken and treated at 30°C. for 24 hours, the grafted solid being collected and extracted with benzene under the same conditions as above, the infrared spectrum exhibited the bands attributable to the organic groups.

c. In the tests below, the grafting conditions were varied in order to obtain a maximum value for the grafting yield.

In each case 50g of $CaCl_2.2H_2O$ and 10 g of $C_3S$ were added to 200 ml of methanol. The operation was carried out at 30°C. for 24 hours.

In case A, 1.5g of $Ca(OH)_2$ and 10 ml of MVDCS were added.

In case B, 1.5g of $Ca(OH)_2$ and 50 ml of MVDCS were added.

In case C, 3g of $Ca(OH)_2$ and 10 ml of MVDCS were added.

In case A, 5% of organic carbon was grafted and the relative intensity of the most intense infrared band (0.92$\mu$) was 0.23. It will be noted that 9.2$\mu$ band is due to Si-O-Si bonds.

In case B the relative intensity of the most intense infrared band (9.2$\mu$) was 0.1.

In case C the grafting was much less extensive than in cases A and B.

The concentration of $Ca(OH)_2$ therefore has a considerable influence on the grafting yield, that is to say the maximum grafting which can be obtained for minimum destruction of $C_3S$.

EXAMPLE 4

In the tests described below, organic methylsilane groups were grafted on hydrated calcium silicate, hexamethyldisiloxane (HMD) being used as the organic reagent.

The samples of hydrated calcium silicates were obtained by known means in the following manner: an intimate mixture of CaO and $SiO_2$ (aerogel) was added in a molar ratio of 1 to a 1 liter balloon flask containing previously boiled distilled water. The precaution of boiling the distilled water was taken in order to eliminate traces of $CO_2$ capable of reacting with CaO in order to form calcium carbonate. The balloon flask was then agitated vigorously and the solution poured into stainless steel test tubes having a capacity of about 100 ml. The test tubes were placed in an autoclave, the heating system put into operation, and on the appearance of water vapor the autoclave was closed hermetically. Starting from this moment the pressure prevailing inside the autoclave rapidly rose until it reached 10 atmospheres.

After several days the autoclave was opened carefully after cooling and the test tubes withdrawn. The synthesized product was rapidly extracted from the tubes and then washed and dried on a Jena 2592 filter with the aid of acetone and then with the aid of ether.

Table II below gives the results of the total analysis and measurement of the specific surface of various samples of hydrated calcium silicate which were subsequently subjected to the grafting process of the invention.

TABLE II

| Sample | | A | B | C | D | E |
|---|---|---|---|---|---|---|
| Firing loss | % | 14 | 12.4 | 7.6 | 6.06 | 5.07 |
| SiO$_2$ | % | 38.7 | 43.45 | 45.26 | 47.09 | 47.63 |
| CaO | % | 46.4 | 40.16 | 46.07 | 46.06 | 46.64 |
| Total | % | 99.1 | 96.1 | 98.93 | 99.21 | 99.39 |
| $\frac{CaO}{SiO_2}$ molar ratio | | 1.27 | 1.028 | 1.081 | 1.047 | 1.049 |
| Specific surface (BET/N$_2$) m$^2$/g | | — | 110 | 39.9 | 25.86 | 29.06 |

Infrared spectroscopy, analysis by X-ray diffraction, and examination with the electronic microscope revealed the differences of structure of the various samples of CSH prepared above. The samples were in the form of mixtures of different crystalline varieties.

For the purpose of the actual grafting the samples of calcium silicate were treated with hydrochloric acid in an acidified isopropyl alcohol medium.

a. The reaction was effected in a balloon flask in a water bath under thermostatic control at 20°, 35° or 50°C. respectively. The reaction mixture was saturated with CaCl$_2$ with the object of slowing down the process of destruction of the lattice by the elimination of the calcium atoms constituting the lattice of the mineral, as has already been exemplified in the case of Example 2 in connection with the treatment of anhydrous calcium silicate.

A mixture of 101 ml of isopropanol saturated with CaCl$_2$ at 20°C. and 4 ml of 12N HCl was prepared in a 500 ml balloon flask having a ground neck. The solution was stirred by a magnetic agitator and 5 ml of HMD added. After hydrolysis of the HMD, which took about 10 minutes, 2 g of hydrated calcium silicate were added.

The reaction was conducted under reflux at the temperatures indicated for periods varying from 5 minutes to 2 hours. The total reaction volume was close to 110 ml.

At the end of the reaction period, the solid was washed 4 or 5 times with methanol until the chloride ions disappeared. This washing was effected by centrifuging in 230 cc containers at 2000 r.p.m. for 2 minutes in each case. The product was finally stove dried at 100°C.

b. In this case the total volume of the reaction medium was brought to 220 ml in order to obtain a higher dilution of the acid (twice as high as in the preceding example 4a).

The same amounts of CSH and 12N HCl were used as in example 4a. The total volume was brought to 220 ml by adding 206 ml of isopropanol saturated with CaCl$_2$ and 10 ml of HMD. The series of operations is similar to that described above.

The progress of the grafting reaction was studied by various means of investigation, particularly by measuring the variation of specific surface and also the CaO and C contents, by carrying out infrared spectroscopy, X-ray diffraction, and also by examination using an electron microscope.

For the purpose of studying the variation of specific surface and also the contents of CaO and C, the tests were carried out with two dilutions (110 and 220 ml) and at three temperatures (20°, 35° and 50°C.).

The extraction of calcium progresses regularly in dependence on the residence time in the reaction medium, except in cases where acidity and temperature are maximum. In this connection it is observed that the presence of the organic reagent accelerates the calcium extraction process.

The shape of the curves showing the organic grafting rate varies in practice from one case to the other. However, generally speaking, the fixation rate is greatest in the early stages of the reaction; all the curves showed a maximum at 15 minutes. Apart from the case in which acidity and temperature are at their highest, the value of this maximum increased with the acidity of the medium and with the temperature. Between 15 and 30 minutes there was a more or less pronounced reduction of the organic content, which increased again subsequently and became stabilized at a value close to the maximum achieved at 15 minutes. The conditions most favorable to the grafting or organic groups thus appeared to be achieved in the experiment conducted with a 110 ml reaction volume and at 35°C.

In all cases the specific surface increased at the start of the reaction, but subsequently its evolution varied in accordance with conditions. With the lesser dilution and with temperatures of 20° and 35°C. it passed through a maximum forming a plateau between 5 and 15 minutes and situated at about 100 m$^2$/g. It then decreased between 15 and 30 minutes and became stabilized at a slightly higher level (50–70 m$^2$/g) than that of the starting compound.

Under the same conditions of concentration but at a temperature of 50°C. the initial increase of the specific surface was less marked, and a plateau situated at about 70 m$^2$/g was followed by a progressive increase to the value of 150 m$^2$/g after 1 hour.

In the tests carried out with a dilution of 220 ml, at the temperatures of 35° and 50°C. the evolution of the specific surface was similar to that observed in the preceding case, although the increase following the plateau was slower. When operating at 20°C. the curve representing the variation of the specific surface passed through a maximum at 5 minutes, a minimum at 15 minutes, a second maximum at 30 minutes, and then decreased progressively.

The infrared spectra obtained from the organic derivatives synthesized under the different operating conditions showed that the modifications of SiO absorptions in the course to the experiment were similar to those noted during attack by acid (see Example 5 below for purposes of comparison). The lines observed at 3.35, 7.95, 11.5, 11.8, and 13.2$\mu$ (2985, 1258, 870, 847, 758 cm$^{-1}$) were due to the organic groups on the silicate.

In the X-ray diffraction patterns of the organic derivatives obtained under the different experimental conditions it was seen that the intensity of the responses decreases progressively in dependence on treatment time. This phenomenon was accelerated both by increased temperature and by increased acidity of the reaction medium.

Under the electron microscope the hydrated calcium silicate obtained by synthesis was seen to be in the form of a mixture of fibres and platelets. In the course of the grafting treatment the morphology scarcely changed. The finest elements disappeared first; the platelets appeared weaker than the fibres, which tended to agglomerate in proportion as the treatment was prolonged The organic derivatives of hydrated tricalcium silicate obtained after grafting were subjected to various treatments to evaluate the strength of the mineral-organic bond and to reveal the surface properties of these derivatives, particularly their hydrophobic character.

In order to evaluate the strength of the bond between the mineral and the trimethylsilyl groups, the grafted samples were subjected to extraction tests with benzene in a Soxhlet apparatus for 24 hours. It was found that the extraction scarcely affected the carbon content, but that it substantially increased the specific surface. The carbon content remained practically unchanged, except in the case of the derivative obtained after 15 minutes, in which it unexpectedly increased considerably.

No difference was found between the infrared spectra recorded before and after the extraction in the Soxhlet apparatus. The same was true of the X-ray diffraction patterns. In particular, the infrared spectrum contained no band characteristic of benzene, which excluded the possibility of explaining the increase in the carbon content by physical adsorption of the solvent.

The hydrophobic properties were investigated either by studying attack on the material by concentrated hydrochloric acid or by establishing water adsorption isotherms. The principle of the latter method is as follows. After degasifying the sample in a vacuum of $10^{-1}$ mm Hg, it is allowed to adsorb determined amounts of water vapor. The pressure at equilibrium makes it possible to calculate the number of millimoles adsorbed and to calculate the surface accessible to water by the B.E.T. method.

It was found that the organic derivative was not attacked by concentrated HCl. As the compound floated on the surface of the acid, vigorous agitation was applied in order to wet it. Nevertheless, it was not possible to detect any trace of calcium, which would be evidence of an attack, in the liquid phase after treatment for one hour.

From the water vapor adsorption isotherms relating to an untreated hydrated calcium silicate (E) and to two organic derivatives thereof E' and E'', prepared by the method of this example, it can be seen clearly that the starting product is much more hydrophilic than the product grafted at 30 minutes. Table III gives a comparison of the values of the specific surface determined by adsorption of nitrogen and water vapor. Whereas in the case of the compound E the water surface showed a heavy increase in relation to that determined with nitrogen, the inverse was observed for the organic derivatives.

TABLE III

| Sample | Comparison of nitrogen and water surfaces | | So in % | %C |
|---|---|---|---|---|
| | SS(B.E.T.,$N_2$) | in $m^2/g$ $H_2O$ | | |
| E | 30 | 54 | + 81 | 0 |
| E' | 50 | 46 | − 7 | 10.81 |
| E'' | 56 | 47 | − 16 | 12.22 |

E untreated sample
E' treatment for 30 minutes, 220 ml, 35°C
E'' treatment 60 minutes, 220 ml; 35°C

EXAMPLE 5

As a comparison, hydrated calcium silicate was subjected to the same treatment as in example 4, but eliminating the HMD reagent, so as to effect only acid attack. The volume of isopropanol saturated with $CaCl_2$ in each case was adjusted to 106 and 206 ml respectively, in order to obtain total volumes of 110 and 220 ml, thus compensating for the absence of HMD.

In particular, the variations of the specific surface and of the CaO and $H_2O$ content in the course of the acid attack at 35°C on the sample were in particular measured for the low dilution treatment (110 ml) and high dilution treatment (220 ml). In a general way, it is found that increase of specific surface went hand in hand with a reduction of CaO content and an increase of the $H_2O$ content. These three phenomena are especially pronounced during the first five minutes of the attack. After 30 minutes the specific surface was stabilized at about 220 $m^2/g$, while the $H_2O$ content continued to increase and the CaO content to decrease, the latter at a speed which was obviously dependent on the acid concentration of the medium.

The infrared spectra at various stages of the acid attack was compared to that of the starting product. These comparative tests were carried out both at low and high dilutions. The spectra obtained with the two dilutions were very similar in general appearance. The main modifications due to the acid treatment were observed in the range from 8 to 15 (1250 to 667 $cm^{-1}$). Between 9 and 11 (1111–909 $cm^{-1}$) there were noted four bands due to Si-O resonances; two high frequency bands situated respectively at 8.3 and 9.2 (1205 $cm^{-1}$ and 1086 $cm^{-1}$), and two low frequency bands centered respectively on 10.5 (953 $cm^{-1}$) and 10.3 (970 $cm^{-1}$).

In proportion as the attack progressed, the 10.3 band decreased in intensity to the advantage of the wide band at 9.2 Simultaneously the 8.3 band tended to be submerged in the flank of the preceding band and that situated at 10$\mu$ decreased progressively. The progress of the attack was likewise characterized by the development of a relatively wide band situated at about 12.5$\mu$ (800 $cm^{-1}$).

In the diffraction spectra provided by the treated samples, at low and high dilutions respectively, it was found that the lines characteristic of the starting product decreased in intensity with increased treatment time. The majority of these lines disappeared after 2 hours. The process was quicker in the concentrated medium than in the dilute medium.

EXAMPLE 6

In this example, grafting was carried out by treating calcium silicate in a methyl alcohol medium, in the presence of allydimethylchlorosilane and hydrochloric acid (25 g of CaCl$_2$.2H$_2$O per 100 ml methanol was previously dissolved).

Under these reaction conditions the C$_3$S was not greatly attacked. The reaction product was found to contain about 70% CaO whereas the starting product (tricalcium silicate) contained 73.5% CaO.

The reaction was carried out in a glass balloon flask as follows:

a. 100 ml methanol, 25 g CaCl$_2$.2H$_2$O and 5 g C$_3$S were introduced successively.

b. 1 ml of 12N hydrochloric acid and 2 ml allyldimethylchlorosilane were then added drop by drop.

c. The reaction was allowed to proceed for 5 hours.

d. The product was then washed in methanol until the chloride ions dissappeared in the methanol used for washing.

In this case the product was separated into three mesh size fractions with grains having an average size of 4$\mu$, 9 to 10$\mu$ and 12 to 15$\mu$. The fractions had the following characteristics:

|  | % CaO | % C |
|---|---|---|
| 4$\mu$ | 57 | 1.9 |
| 9–10$\mu$ | 70 | 0.7 |
| 12–15$\mu$ | 71 | 0.4 |

It was not possible to determine a difference in carbon content before and after extraction of the product with benzene.

EXAMPLE 7

In this example grafting was effected by the treatment of calcium silicate in a methyl alcohol medium in the presence of methylvinyldichlorosilane and hydrochloric acid.

First, 50 g of CaCl$_2$·2H$_2$O was dissolved in 200 ml methanol.

The C$_3$S was not strongly attacked under the conditions of the reaction medium. The reaction product was found to contain 64% CaO whereas the starting product (tricalcium silicate) contained 73.5% CaO.

The reaction was effected in a glass balloon flask, into which were successively introduced 100 ml methanol, 50 g CaCl$_2$·2H$_2$O and 10 g C$_3$S. 1 ml 12N hydrochloric acid and 2 ml methylvinyldichlorosilane were then added drop by drop. The reaction was allowed to proceed for 24 hours. The product was then washed with methanol until the chloride ions in the washing methanol disappeared.

In this case the product was found to contain 64% CaO and 1.1% carbon.

After extraction with boiling benzene for 48 hours the level of carbon is 0.55%.

EXAMPLE 8

The following tests illustrate qualitatively the influence of the solvent in effecting grafting in a manner identical to that described in examples 4$a$ and 4$b$. CSH was used as starting compound but isopropanol was replaced by acetone, methanol, and ethanol respectively.

The apparent dielectric constants of these solvents are respectively 20.7, 24.3, and 32.6, as compared with that of isopropanol, which is 18.3. Nevertheless, the effective values of the dielectric constants are different in solutions saturated with CaCl$_2$.

Calcium silicate treated in acetone presented no characteristic band attributable to organic radicals when subjected to analysis by infrared spectroscopy. Only an accentuation of the band at 10.3$\mu$, attributable to SiOH, was observed. On the other hand for ethyl and methyl alcohols bands characteristic of the organic groups appeared.

In the case of methanol, for example, it was found that after attack with a mixture of HCl dissolved in methanol the anhydrous cement was separated into two fractions. The infrared spectra showed that the first fraction was composed of pure, ungrafted cement whereas the other fraction was grafted cement. Nevertheless, hydration of a mixture of these two fractions could be effected in a satisfactory manner.

The organic derivatives of anhydrous or hydrated calcium silicate which are obtained by the process of the invention are capable of numerous applications. It is, for example, possible to effect the grafting on products based on hydrated calcium silicate, such as cement which has set, in the form of bricks, parpens, and other formed items, in order to impart to them increased resistance to corrosive agents and weather. A product based on the calcium silicate derivatives could be used as a coating for the purpose of waterproofing and/or protecting a building material, while in addition the description given above has shown that grafting can also be effected on anhydrous calcium silicate, thus obtaining a hydraulic product. With these hydraulic binders it is possible to produce concretes and mortars having better waterproof properties and materials having greater resistance to compression and chemical attack than materials of conventional type based solely on cement.

The hydration of the grafted C$_3$S proceeds in a normal manner, as is shown by the relative decrease of intensity of the C$_3$S peaks under X-ray spectrography, and by electronic microscope photograph. The infrared spectrum of a sample of hydrated grafted C$_3$S is practically identical to the spectra obtained with samples of hydrated C$_3$S. The new grafted products can therefore be used as ordinary cements, their hydraulic properties remaining perfectly preserved.

Another field of application is provided by those organic derivatives of calcium silicate according to the invention in which the grafted silane groups are unsaturated, for example containing vinyl or olefin groups.

In this case, these derivatives may be used as aggregates in interpolymerisation reactions with a resin or polymer, which may be introduced in the form of a monomer or prepolymer by impregnation of the grafted calcium silicate structure. Thus, the product resulting from the grafting and still containing vinyl groups can be copolymerised with an organic derivative of the polyester type, introduced by impregnation.

I claim:

1. A method of grafting organosilicon groups onto calcium silicate, comprising contacting intimately calcium silicate with a liquid reaction medium having at least one organosilane or hydrolysable organosiloxane and wherein at least one moiety of which corresponds to the substituted organosilicon groups to be grafted, said siloxane or silane being dissolved in a solvent consisting essentially of an alkanol and a suitable amount of a water soluble calcium salt, said medium being acidified so as to provide an H$^+$ ion concentration permitting both the hydrolysis of said siloxane or silane and the dissolution of at least a portion of the calcium ions available in the silicate utilized, the reaction being effected at a temperature between ambient temperature and the reflux temperature of the medium and for a reaction time sufficient to permit grafting.

2. A method according to claim 1, wherein the solvent is saturated with a water soluble calcium salt.

3. A method according to claim 1, wherein the solvent is less than saturated with a water soluble calcium salt 4. A method according to claim 1, wherein the organosilicon group grafted is an alkylsilyl group.

5. A method according to claim 4, wherein the organosilicon group grafted is a trimethylsilyl group, and the siloxane used for the reaction is hexamethyldisiloxane.

6. A method according to claim 1, wherein the group grafted in an unsaturated organically substituted silyl group.

7. A method according to claim 6, wherein the substituted silyl group grafted is ethylenically unsaturated.

8. A method according to claim 1, wherein the substituted silyl group grafted contains a halogen atom or hydroxyl group.

9. A method according to claim 1, wherein the hydrolysable substituent or substituents of the organsilicon reagents are chloro groups and the hydrocarbon substituents of said reagents are alkyl groups.

10. A method according to claim 1, wherein a silane having more than one hydrolysable substituent and which may have saturated or unsaturated hydrocarbon substituents is used in the grafting reaction, in which case the grafted group is a polysiloxanyl group having saturated or unsaturated hydrocarbon substituents corresponding to those of the starting silane.

11. A method according to claim 10, wherein methylvinyldichlorosilane is used as the organic silicon reagent, in which case the grafted group is methylvinylpolysiloxanyl.

12. A method according to claim 1, wherein a silane having a single hydrolysable substituent and which may have saturated or unsaturated hydrocarbon substituents is used in the grafting reaction, in which case the grafted group is a silane group having saturated or unsaturated hydrocarbon substituents corresponding to those of the starting silane.

13. A method according to claim 12, wherein the silane used in the reaction is allyldimethylchlorosilane, in which case the grafted group is allyldimethylsilane.

14. A method according to claim 1, wherein a mineral acid yielding soluble calcium salts is used to provide the $H^+$ ion concentration in the reaction medium.

15. A method according to claim 14, wherein the mineral acid is hydrochloric acid.

16. A method according to claim 1 wherein the water soluble calcium salt is $CaCl_2$.

17. A method according to claim 1, wherein the alkanol is methanol, ethanol, or isopropanol.

18. A method according to claim 1, wherein the calcium silicate is tricalcium silicate ($C_3S$).

19. A method according to claim 1, wherein the calcium silicate is hydrated calcium silicate (CSH).

20. A method of grafting organosilicon groups onto calcium silicate characterized in that a calcium silicate selected from the group consisting of tricalcium silicate ($c_3S$) and hydrated calcium silicate (CSH) is brought into intimate contact with a liquid reaction medium comprising a compound selected from the group consisting of hexamethyldisiloxane, methylvinyldichlorosilane and allyldimethylchlorosilane dissolved in an alkanol selected from the group consisting of methanol, ethanol and isopropanol, and wherein said alkanol is saturated or less than saturated with an amount of $CaCl_2$, the reaction medium being acidified with hydrochloric acid to provide an $H^+$ ion concentration permitting both the hydrolysis of the siloxane and the dissolution of at least a fraction of the calcium ions available in the silicate utilized, the reaction being effected at a temperature between ambient temperature and the reflux temperature of the medium and for a reaction time sufficient to permit grafting.

21. Tricalcium silicate onto which polysiloxanyl groups have been grafted, having the formula :

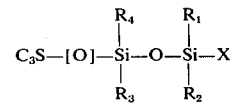

where $R_1$, $R_2$, $R_3$ and $R_4$ are hydrocarbon radicals which may be the same or different an X is a halogen atom.

22. The tricalcium silicate of claim 21 wherein the polysiloxanyl group is methylvinylpolysiloxanyl which has the formula :

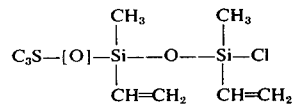

23. A composition which is both organophilic and hydrophobic, said composition consisting essentially of hydrous or hydrated tricalcium silicate having polysiloxanyl groups grafted thereon to replace a portion of the calcium atoms, the grafted portion of said composition having the formula:

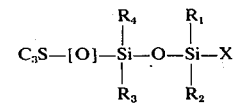

where $R_1$, $R_2$, $R_3$ and $R_4$ are hydrocarbon radicals which may be the same or different and X is a halogen atom.

24. The composition of claim 23 wherein said polysiloxanyl group is methylvinyldichlorosilane, said composition having about 5 percent grafted organic carbon.

* * * * *

UNITED STATES PATENT AND TRADEMARK OFFICE
CERTIFICATE OF CORRECTION

PATENT NO. : 3,909,285
DATED : September 30, 1975
INVENTOR(S) : Jose Marie Maurice Julien Fripiat It is certified that error appears in the above-identified patent and that said Letters Patent are hereby corrected as shown below:

Column 3, line 31, "is" should read -- in --;

Column 4, line 13, "infrafed" should read -- infrared --;

Column 4, line 35, there should be a solid line on either side of the "O" instead of broken lines;

Column 4, line 38, "polysiloxanyl" is misplaced;

Column 7, line 49, there should be a solid line between the formulas instead of broken lines;

Column 10, line 32, "or" should read -- of --;

Column 11, line 42, "$10^{-1}$" should read -- $10^{-6}$ --;

Column 12, line 50, insert a period after "9.2";

Column 15, line 18, "in" should read -- is --;

Column 16, line 5, "(c$_3$S)" should read -- ($C_3S$) --; and

Column 16, line 38, there should be a solid line on either side of "O" not broken lines.

Signed and Sealed this eighth Day of June 1976

[SEAL]

Attest:

RUTH C. MASON
Attesting Officer

C. MARSHALL DANN
Commissioner of Patents and Trademarks